(12) United States Patent
Ono (10) Patent No.: US 6,301,448 B1
(45) Date of Patent: Oct. 9, 2001

(54) BATTERY HOLDING STRUCTURE

(75) Inventor: Yoshinori Ono, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,083

(22) Filed: Sep. 30, 1999

(30) Foreign Application Priority Data

Oct. 1, 1998 (JP) .................................................. 10-280148

(51) Int. Cl.[7] .................................................. G03B 17/02
(52) U.S. Cl. .......................................... 396/539; 206/703
(58) Field of Search .................................... 396/277, 278, 396/279, 539; 429/97; 206/703, 704, 705

(56) References Cited

U.S. PATENT DOCUMENTS 4,712,898 * 12/1987 Haraguchi ............................ 396/539

FOREIGN PATENT DOCUMENTS 6-88048    12/1994   (JP) .

* cited by examiner

Primary Examiner—W. B. Perkey
(74) Attorney, Agent, or Firm—Greenblum & Bernstein, P.L.C.

(57) ABSTRACT

A battery holding structure for exchangeably accommodating a battery is disclosed. The structure comprises; a battery container for exchangeably accommodating a battery therein, the container being provided with an opening through which a battery is to be taken in and out; a container cap detacheably coupled to the battery container to close the opening of the container; and a switching mechanism including a stationary contact member and a movable contact member both disposed on the battery container, the movable contact member being arranged to be actuated in response to the relative movement of the container cap with respect to the container. The switching mechanism is used, for instance, to keep a control system of a camera at its reset state during exchange of battery.

30 Claims, 6 Drawing Sheets

BATTERY HOLDING STRUCTURE

BACKGROUND OF THE INVENTION

This invention relates to a battery holding structure adapted for use in, for instance, a camera.

In a camera using a battery as a power source, it is unavoidable to change a battery accommodated therein with a new one when a currently loaded battery is used up. During battery exchange, however, there is a possibility that chattering occurs between a battery and terminals of a camera. Chattering is a phenomenon in which violent voltage fluctuation is seen at the contacts of a battery and terminals accompanying the rapid alteration of continuity and discontinuity of current having a period of $\mu$ sec order. This may cause in a camera employing a CPU (Central Processing Unit) for controlling its operation, a CPU to run away due to chatterings to cause electric malfunctions such as improper initializations of a CPU.

SUMMARY OF THE INVENTION

It is therefore the object of the present invention to provide a battery holding structure adapted for use in, for instance, a camera, capable of preventing occurrence of electric malfunction due to chatterings during battery exchange.

According to one aspect of the present invention there is provided a battery holding structure for exchangeably accommodating a battery therein which comprises:

- a battery container for exchangeably accommodating a battery therein, the container being provided with an opening through which a battery is to be taken in and out;
- a container cap detacheably coupled to the battery container to close the opening of the container; and
- a switching mechanism including a stationary contact member and a movable contact member both disposed on the battery container, the movable contact member being arranged to be actuated in response to the relative movement of the container cap with respect to the container.

With the above constituted container, the switching mechanism is operated when battery exchange is carried out as the container cap is moved relative to the container.

In a preferred embodiment of the invention, the container cap comprises a screw-type container cap to be threaded to the battery container.

In one embodiment of the invention, the battery container comprises a fitting member fixed in front of the opening, the fitting member being formed with a center hole corresponding to the opening and provided with an inner thread on the inner circumferential surface of the center hole; and the container cap is provided with a center boss having an external thread on the outer circumferential surface thereof to be screwed to the inner thread of the fitting member.

Further, the container is provided with a sleeve member to be slidably accommodated in the battery container, the sleeve member being detacheably coupled to the container cap at one end thereof to accomodate a battery therein with the upper portion of the battery being protruded from the other end of the sleeve member; and the battery container comprises an inner wall member in which a battery is accommodated together with the sleeve member.

On the inner wall member, a through-hole is formed at the position where the other end of the sleeve member reaches when the sleeve member is fully introduced into the container; and the stationary contact member is fixed on the outer surface of the inner wall member, while the movable contact member is provided with a free end portion which is biased to go beyond the inner wall member via the throughhole. The free end of the movable contact member is pressed against the biasing force by the outer surface of the sleeve member when the sleeve member is fully introduced into the container.

Preferably, the movable contact member is made of an elastic material and is normally forced to contact the stationary member by its elasticity, and is detached from the stationary member when the free end is pressed outwardly by the sleeve member.

In other embodiment of the present invention, the stationary contact member is fixed on the inner surface of said fitting member, while the movable contact member is provided with a free end portion which is arranged to contact the stationary contact member, the free end portion being formed to be pressed by the container cap when the container cap is screwed to the fitting member.

Preferably, the movable contact member is made of an elastic material and is normally forced to contact the stationary member by its elasticity, and is detached from the stationary member when the free end portion is pressed by the container cap.

In other aspect of the present invention, a battery holding structure is applied to a camera employing a battery as a power source for electronically operating a control system of the camera, wherein the operation of the control system is suspended during exchange of battery as the switching mechanism is correspondingly operated. For instance, the switching mechanism is connected to a reset terminal of the control system to keep the control system at its reset state during exchange of battery.

Preferably, the control system is kept at its reset state while the movable contact member is being detached from the stationary contact member.

DESCRIPTION OF THE PREFERRED EMBODIMENTS

Figure 1:
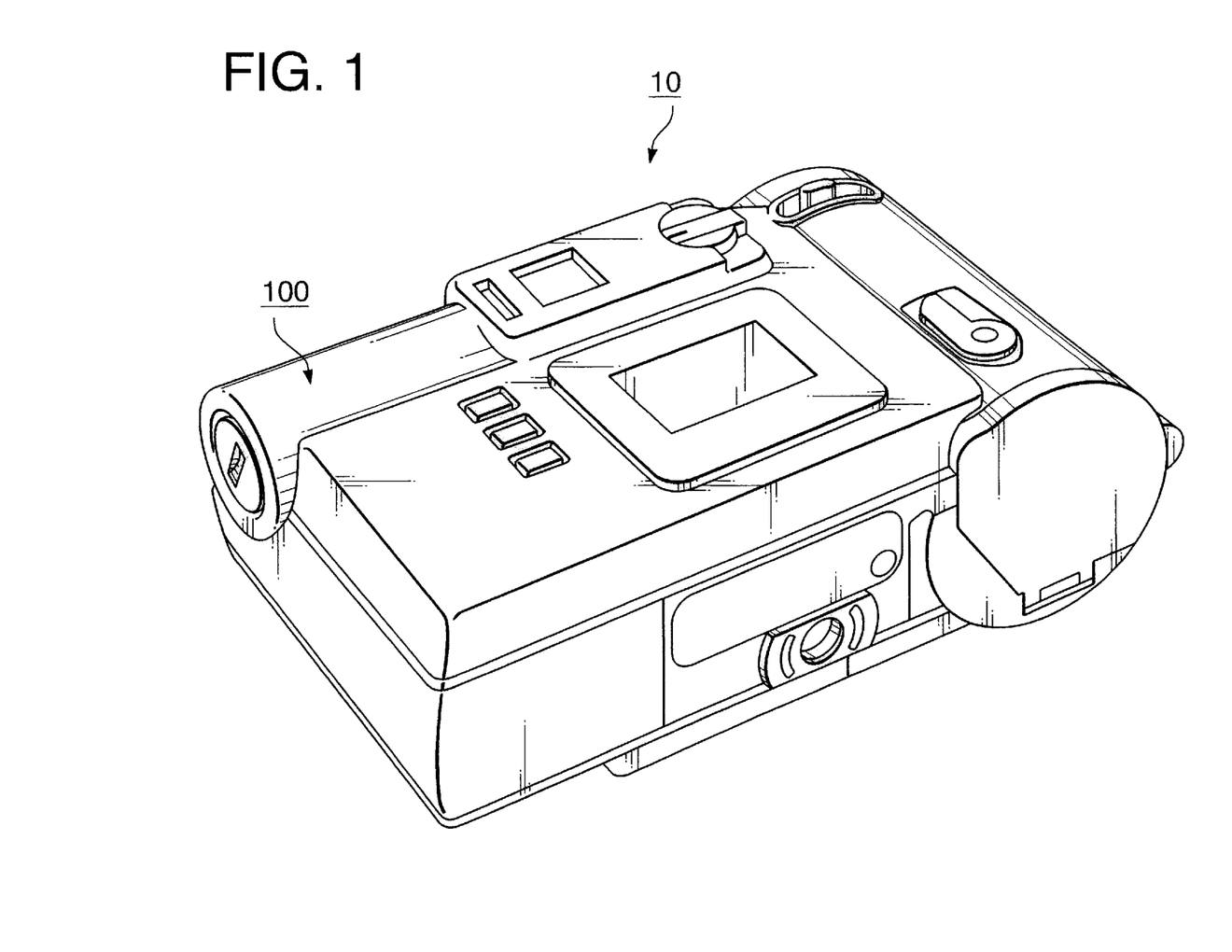
FIG. 1 is a perspective view of a camera employing a battery holding structure embodying the invention.

FIG. 1 is a perspective view of a compact camera 10 having a battery container unit 100 at the upper left side thereof.

[First Embodiment]

Figure 2:
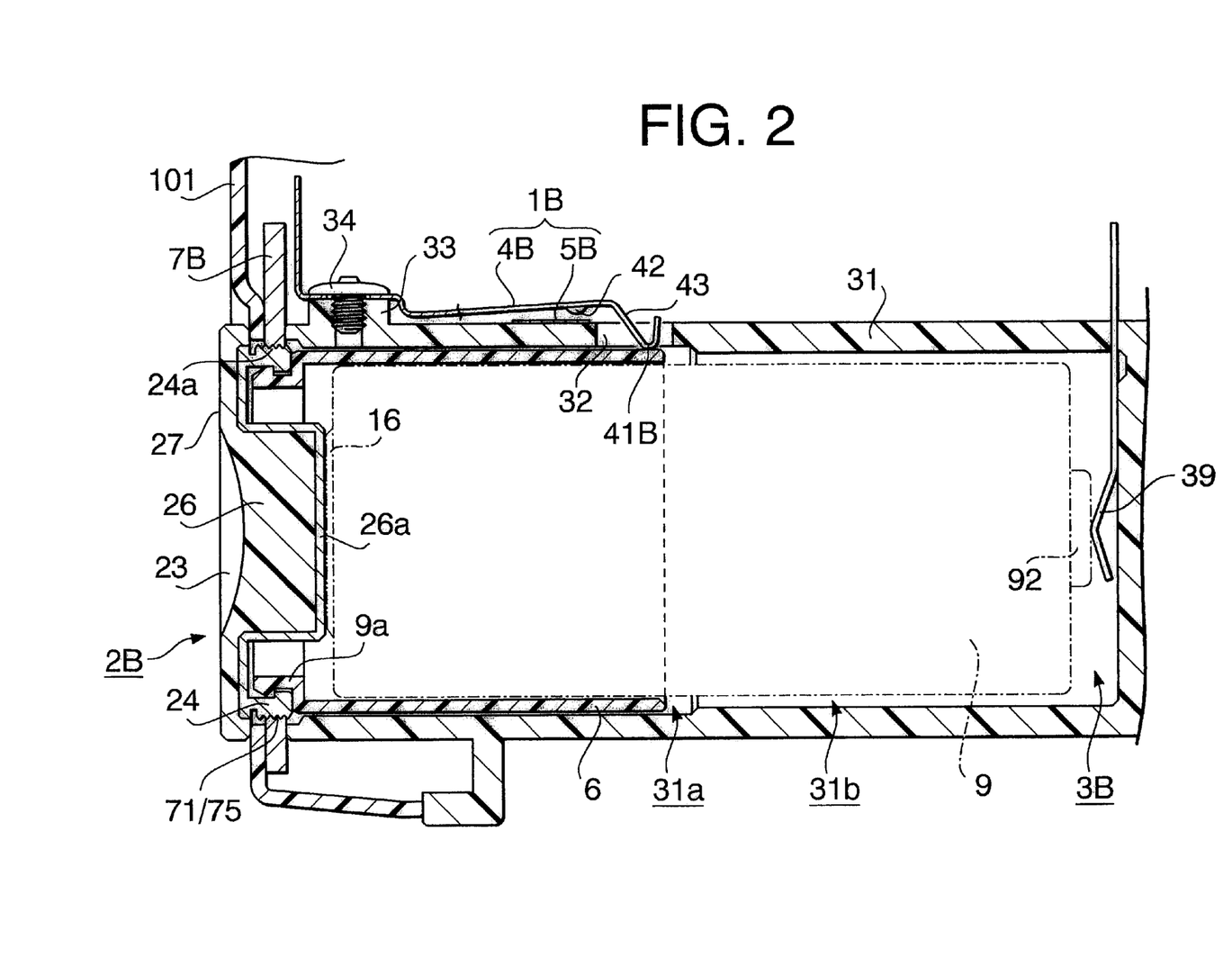
FIGS. 2 & 3 are fragmentary cross-sectional views showing a battery holding structure of FIG. 1.
Figure 3:
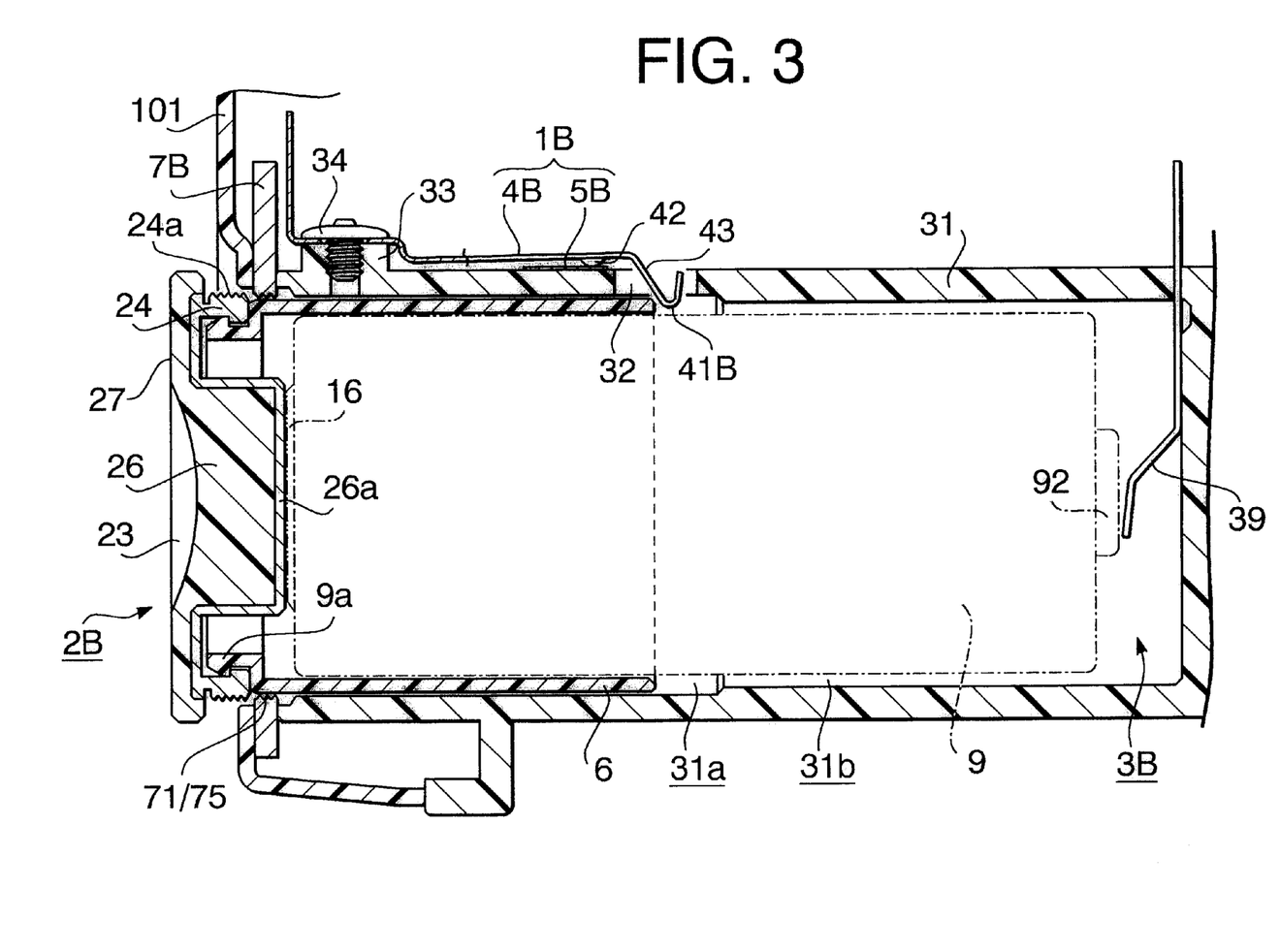

FIG. 2 and FIG. 3 are fragmentary cross-sectional views of the battery container unit 100 shown in FIG. 1. As shown in FIG. 2, the battery container unit 100 accommodates a battery 9 in a battery compartment 3B formed therein. The battery compartment 3B is defined by a container frame 101, a battery compartment wall 31, a fitting plate 7B disposed between the frame 101 and the wall 31, and a screw-type battery container cap 2B detacheably screwed to the fitting plate 7B. Further, a battery holding sleeve 6 is provided as an intermediate member to be disposed between the wall 31 and the battery 9.

The container frame 101 and the wall 31 are made of a non-conductive material such as a plastic resin to prevent short circuit between a battery 9 and other members of the camera 10.

On the other hand, the fitting plate 7B is made of a conductive material such as a metal and fixed to the frame 101 and the wall 31 by means of a fastening member like a screw, not shown. The fitting plate 7B is provided with a center circular opening 75 having an internal thread 71 formed on the inner peripheral surface thereof. The fitting plate 7B is electrically connected to a ground terminal of an electric circuit, not shown, of the camera 10.

The container cap 2B is generally formed in a disc-like shape having a larger diameter than that of the center circular opening 75 of the fitting plate 7B, and a linear center groove 23 is formed on the outer surface 27, i.e., the surface facing outward when screwed to the container unit 100, of the cap 2B.

A circular rib 24 having the outer diameter substantially corresponding to the diameter of the center opening 75 of the fitting plate 7B is protruded from the inner surface, i.e., the surface facing inside the compartment 3B when screwed to the container unit 100, of the cap 2B. An external thread 24a is formed on the outer circumferential surface of the rib 24 to be meshed with the internal thread 71 of the fitting plate 7B. When the cap 2B is fully screwed into the compartment 3B with the external thread 24a of the rib 24 being engaged with the internal thread 71 of the fitting plate 7B, the battery compartment 3B is thereby completely closed.

A center columnar boss 26 having a larger height than that of the circular rib 24 is formed on the inner surface of the cap 2B such that the top surface 26a of the boss 26 is forced to contact a negative terminal 16 of a battery 9 accommodated in the battery compartment 3B when the cap 2B is screwed into the compartment 3B.

The center columnar boss 26, the circular rib 24 and the connecting portions therebetween of the inner surface of the cap 2B are made of a conductive material such as a metal, thereby the negative terminal 16 of a battery 9 is electrically connected to the fitting plate 7B when the cap 2B is screwed into the compartment 3B.

The intermediate battery holding sleeve 6 is formed as a cylindrical member by a non-conductive material such as a plastic resin. The outer diameter of the holding sleeve 6 is so set as to be coaxially and relatively slidably fitted into the wall 31, while the inner diameter and the height thereof are so set as to fixedly accomodate a substantially half portion of a battery 9 therein. One end (the leftmost end in FIG. 2) of the holding sleeve 6 is formed as a smaller diameter circular portion 9a to be relatively rotatably interfitted with the circular rib 24 of the cap 2B, thereby the holding sleeve 6 is detacheably coupled to the cap 2B.

It should be noted that, as the sleeve 6 is relatively rotatably coupled to the cap 2B, the rotation of the cap 2B is not obstructed even if friction is caused between the sleeve 6 and the inner surface of the wall 31.

At the center of the innermost end of the battery compartment wall 31, provided is a leaf-spring electric terminal 39 arranged to resiliently contact a positive terminal 92 of a battery 9 when a battery 9 is inserted into the battery compartment 3B.

On the outer surface of the battery compartment wall 31, arranged is a switch mechanism 1B consisted of a switching arm 4B and a switching plate 5B.

The switching arm 4B is made of an elastic conductive material such as a metal, and secured at the intermediate portion thereof to a mounting boss 33 formed on the outer surface of the wall 31 by means of a fastening screw 34. The arm 4B is biased toward the outer surface of the wall 31 by means of elasticity thereof. The front end of the arm 4B is vent to form a substantially V-shaped hook 41B which is to be introduced into the battery compartment 3B via a later-described through-opening 32 of the wall 31. At the portion between the hook 41B and the mounting boss 33 on the inner surface of the arm 4B, a point contact 42 is formed to face the outer surface of the wall 31. The tail end of the arm 4B, not shown, is electrically connected to a reset terminal of a CPU, not shown, of the camera 10.

The switching plate 5B is made of a conductive material such as a metal and fixed to the outer surface of the wall 31 at the position facing to the point contact 42 of the switching arm 4B. As the arm 4B is biased toward the wall 31, the point contact 42 is urged to contact the switching plate 5B. The switching plate 5B is, on the other hand, electrically connected to a ground terminal of an electric circuit, not shown, of the camera 10 via the fitting plate 7B.

The V-shaped hook 41B is formed such that, under the state illustrated in FIG. 2 in which the holding sleeve 6 contacts the hook 41B just inside the through-opening 32 of the wall 31, the hook 41B is forced to be out of the battery compartment 3B by the holding sleeve 6 against the elasticity of the switching arm 4B, so that the point contact 42 of the arm 4B is detached from the switching plate 5B fixed to the outer surface of the wall 31. On the contrary, under the state illustrated in FIG. 3 in which the holding sleeve 6 does not exist, the point contact 42 is forced to contact the switching plate 5B by the elasticity of the switching arm 4B.

The inside of the battery compartment wall 31 is divided into a larger diameter portion 31a and a smaller diameter portion 31b in the direction along which a battery 9 is inserted thereinto. The larger diameter portion 31a is formed to be able to accomodate the battery holding sleeve 6 together with a battery 9, while the smaller diameter portion 31b is formed to be able to accomodate only the front half portion of a battery 9 protruded out of the holding sleeve 6. At the innermost side of the larger diameter portion 31a of the wall 31, the above-mentioned through-opening 32 is formed.

Hereafter, a battery exchange in the above constituted battery holding structure will be explained exemplifying the case in which an old battery accommodated in the battery container unit 100 is replaced with a new battery.

First of all, a coin or the like is fitted in the center groove 23 on the outer surface of the container cap 2B, and rotated in a clockwise-direction to unscrew the container cap 2B from the fitting plate 7B.

When the cap 2B is rotated by a certain amount, the battery holding sleeve 6 which is coupled to the cap 2B is moved to the position illustrated in FIG. 3, where the V-shaped hook 41B is allowed to enter into the battery compartment 3B and the point contact 42 comes into contact with the switching plate 5B.

With further rotating the cap 2B, the external thread 24a of the circular rib 24 of the cap 2B is completely disengaged from the internal thread 71 of the fitting plate 7B. Thus, the cap 2B can be separated from the camera 10 together with the battery holding sleeve 6, and a currently loaded battery 9 is taken out of the container unit 100.

Then, a new battery 9 to be loaded is placed in the holding sleeve 6 coupled to the cap 2B, with the positive terminal thereof facing outward, and is inserted into the battery compartment 3B together with the holding sleeve 6 coupled to the cap 2B. When the cap 2B and the holding sleeve 6 are blocked by the fitting plate 7B to further approach into the battery compartment 3B, the cap 2B is rotated counter-clockwise direction by a coin or the like so that the external thread 24a of the circular rib 24 of the cap 2B is screwed with the internal thread 71 of the fitting plate 7B.

In the meantime, when the battery holding sleeve 6 is inserted into the compartment 3B beyond the position illustrated in FIG. 3, the innermost and of the holding sleeve 6 comes into contact with the slant portion 43 of the V-shaped hook 41B and to force the hook 41 to be moved outwardly against the elasticity of the switching arm 4B.

When the external thread 24a of the circular rib 24 of the cap 2B is completely meshed with the internal thread 71 of the fitting plate 7B as illustrated in FIG. 2, a new battery 9 is firmly located between the leaf-spring electric terminal 39 and the top surface 26a of the boss 26 of the cap 2B in the battery compartment 3B. Further, the point contact 42 of the switching arm 4B is kept away from the switching plate 5B as the V-shaped hook 41B of the switching arm 4B is prevented to enter into the battery compartment 3B by means of the outer surface of the holding sleeve 6.

According to the above explained battery holding structure in a camera embodying the invention, the switching mechanism 1B is being turned ON during the substantial period of the battery exchange in the camera 10, which causes a CPU, not shown, of the camera 10 to be kept in a RESET state.

More particularly, under the normal condition illustrated in FIG. 2 wherein a battery 9 is completely loaded in the battery compartment 3B to function as a power source for electrically operating the camera 10, the battery holding sleeve 6 exists right inside the through-opening 32 of the battery container wall 31, which prevents the V-shaped hook 41B of the switching arm 4B to enter into the battery compartment 3B, thereby the point contact 42 of the switching arm 4B being detached from the switching plate 5B, i.e., the switching mechanism 1B is being turned OFF.

On the other hand, at the initial stage of the battery exchange, the innermost end of the battery holding sleeve 6 is moved toward left in FIG. 2 with the initial-state rotation of the container cap 2B and out of contact from the V-shaped hook 41B as illustrated in FIG. 3. Under this condition, the V-shaped hook 41B is allowed to enter into the battery compartment 3B and the point contact 42 of the switching arm 4B is forced to be in contact with the switching plate 5B by the elasticity of the switching arm 4B, i.e., the switching mechanism 1B is being turned ON. This ON state of the switching mechanism 1B is kept until the innermost end of the battery holding sleeve 6 is again inserted into the battery compartment 3 together with a new battery 9 and brought into contact with the V-shaped hook 41 at the last stage of the battery exchange, to force it to be moved out of the battery compartment 3B against the elasticity of the switching arm 4B.

Thus, even though a battery 9 may insecurely keep or intermittently restore the contact with the leaf-spring terminal 39 and the top surface 26a of the boss 26, after the initial stage or before the last stage of battery exchange (i.e., after or before the stage illustrated in FIG. 3), the operations by a CPU, not shown, of the camera 10 is not influenced at all as a CPU is kept at its RESET state by the switching mechanism 1B during battery exchange.

[Second Embodiment]

Figure 4A:
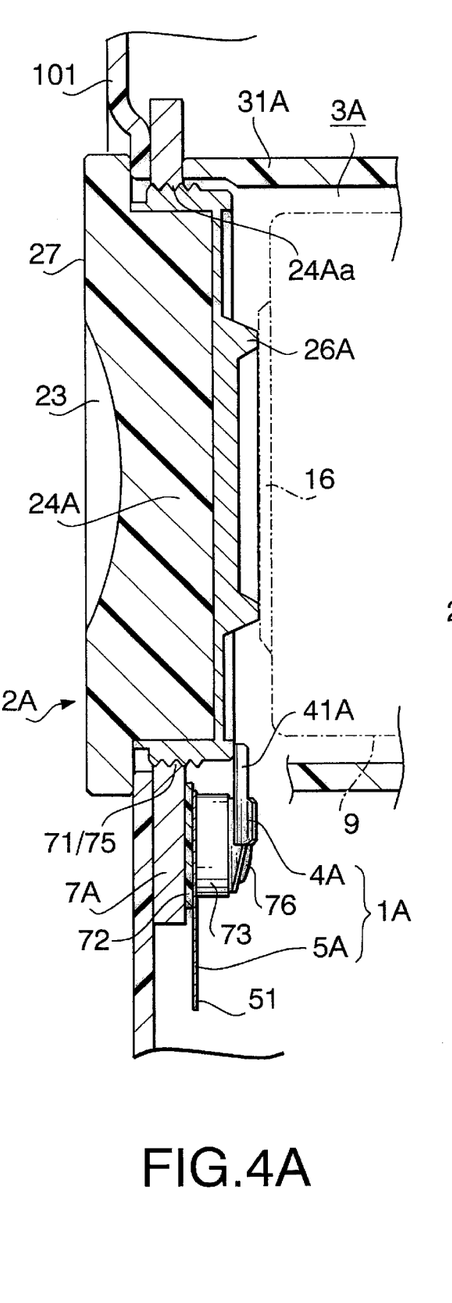
FIGS. 4A & 5A are fragmentary cross-sectional views showing another battery holding structure of FIG. 1.
Figure 5A:
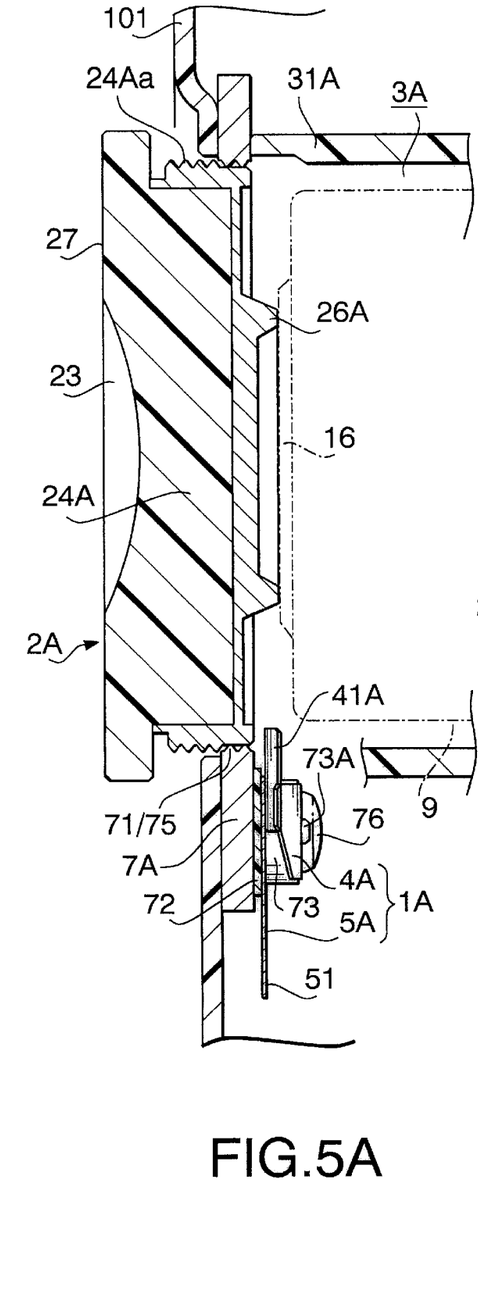

FIG. 4A and FIG. 5A are fragmentary cross-sectional views of the second embodiment of the battery container unit 100 shown in FIG. 1.

As shown in FIG. 4A, the battery container unit 100 accommodates a battery 9 in a battery compartment 3A formed therein. The battery compartment 3A is defined by a container frame 101, a battery compartment wall 31A, a fitting plate 7A disposed between the frame 101 and the wall 31A, and a screw-type battery container cap 2A detacheably screwed to the fitting plate 7A. The container frame 101 and the wall 31A are made of a non-conductive material such as a plastic resin to prevent short circuit between a battery 9 and other members of the camera 10.

On the other hand, the fitting plate 7A is made of a conductive material such as a metal and fixed to the frame 101 and the wall 31A by means of a fastening member like a screw, not shown. The fitting plate 7A is provided with a center circular opening 75 having an internal thread 71 formed on the inner peripheral surface thereof. The fitting plate 7A is electrically connected to a ground terminal of an electric circuit, not shown, of the camera 10.

The container cap 2A is generally formed in a disc-like shape having a larger diameter than that of the center circular opening 75 of the fitting plate 7A, and a linear center groove 23 is formed on the outer surface 27 thereof.

A center columnar boss 24A having the outer diameter substantially corresponding to the diameter of the center opening 75 of the fitting plate 7A is inwardly protruded from the inner surface of the cap 2A. An external thread 24Aa is formed on the outer circumferential surface of the boss 24A to be meshed with the internal thread 71 of the fitting plate 7A. When the cap 2A is fully screwed into the compartment 3A with the external thread 24Aa of the boss 24A being engaged with the internal thread 71 of the fitting plate 7B, the battery compartment 3B is thereby completely closed.

A center circular rib 26A is formed on the inner surface of the columnar boss 24A such that the top surface of the rib 26A is forced to contact a negative terminal 16 of a battery 9 accommodated in the battery compartment 3A when the cap 2A is screwed into the compartment 3A.

The center columnar boss 24A, the circular rib 26A and the connecting portions therebetween of the inner surface of the cap 2A are made of a conductive material such as a metal, thereby the negative terminal 16 of a battery 9 is electrically connected to the fitting plate 7A when the cap 2A is screwed into the compartment 3A.

On the inner circumferential surface of the fitting plate 7A, arranged is a switch mechanism 1A consisted of a switching arm 4A and a switching plate 5A.

The switching arm 4A is made of an elastic conductive material such as a metal, and secured at the base end thereof to a mounting platform 73 which is made of a non-conductive material such as a plastic resin. The mounting platform 73 is provided with a pair of bosses 73A, 73A and another pair of bosses 73B, 73B, vertically protruded therefrom. The pair of bosses 73A, 73A are for positioning the switching arm 4A with respect to the platform 73, while the another pair of 73B, 73B are for positioning the platform 73 itself with respect to the fitting plate 7A. The mounting platform 73 is fixed to the fitting plate 7A by means of a fastening screw 76 through an opening 73C with sandwiching the base end of the switching arm 4A between the screw head of the fastening screw 76 and the mounting platform 73. The screw 76 is made of a conductive material such as a metal, and therefore the switching arm 4A is electrically connected to a reset terminal of a CPU, not shown, of the camera 10 via the screw 76 and the fitting plate 7A. The front free end of the arm 4A is formed as a hook portion 41A having a substantially U-shaped sectional configuration, and is biased toward the fitting plate 7A (leftwardly in FIGS. 4A & 4B) by means of elasticity of the switching arm 4A itself.

The switching plate 5A is made of a conductive material such as a metal, and fixed to the inner surface of the fitting plate 7A via an insulating plate 72 made of a non-conductive material such as a plastic resin to prevent short-circuit between the switching plate 5A and the fitting plate 7A. The switching plate 5A is further provided with a lug 51 to be electrically connected to a ground terminal of an electric circuit, not shown, of the camera 10 via a connecting cable, not shown.

The switching plate 5A and the insulating plate 72 are formed with openings 5A*a* and 72A, respectively, through which the fastening screw 76 passes, but short-circuit between the conductive screw 76 and the switching plate 5A is prevented by an insulating layer formed around the periphery of the opening 5A*a* of the plate 5A.

Figure 4B:
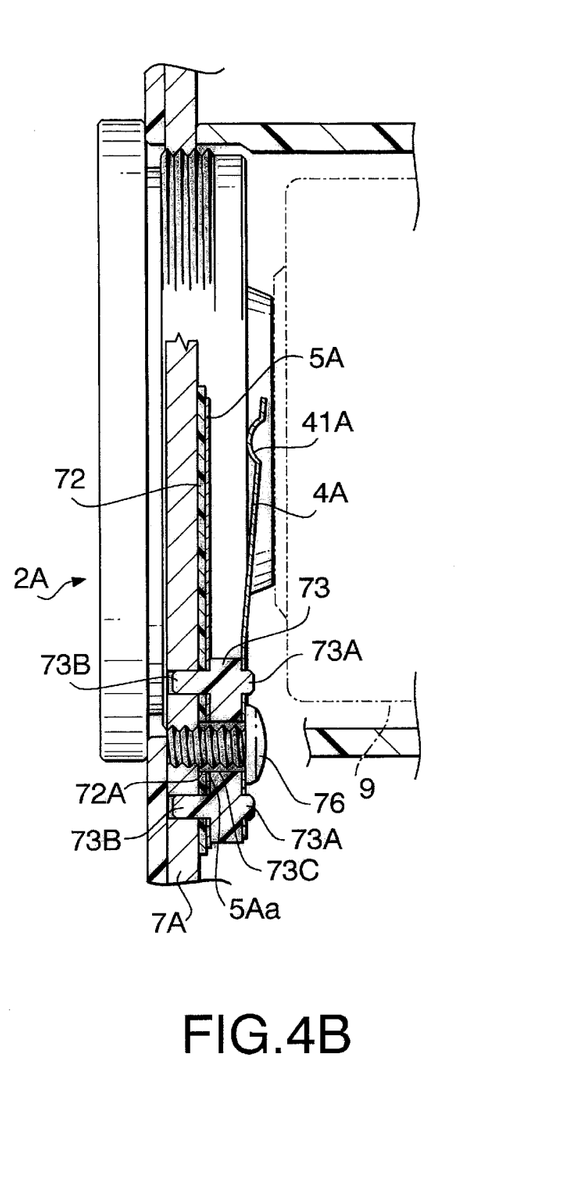
FIGS. 4B & 5B are partial cross-sectional views of a different section than FIGS. 4A & 5A, respectively.
Figure 4C:
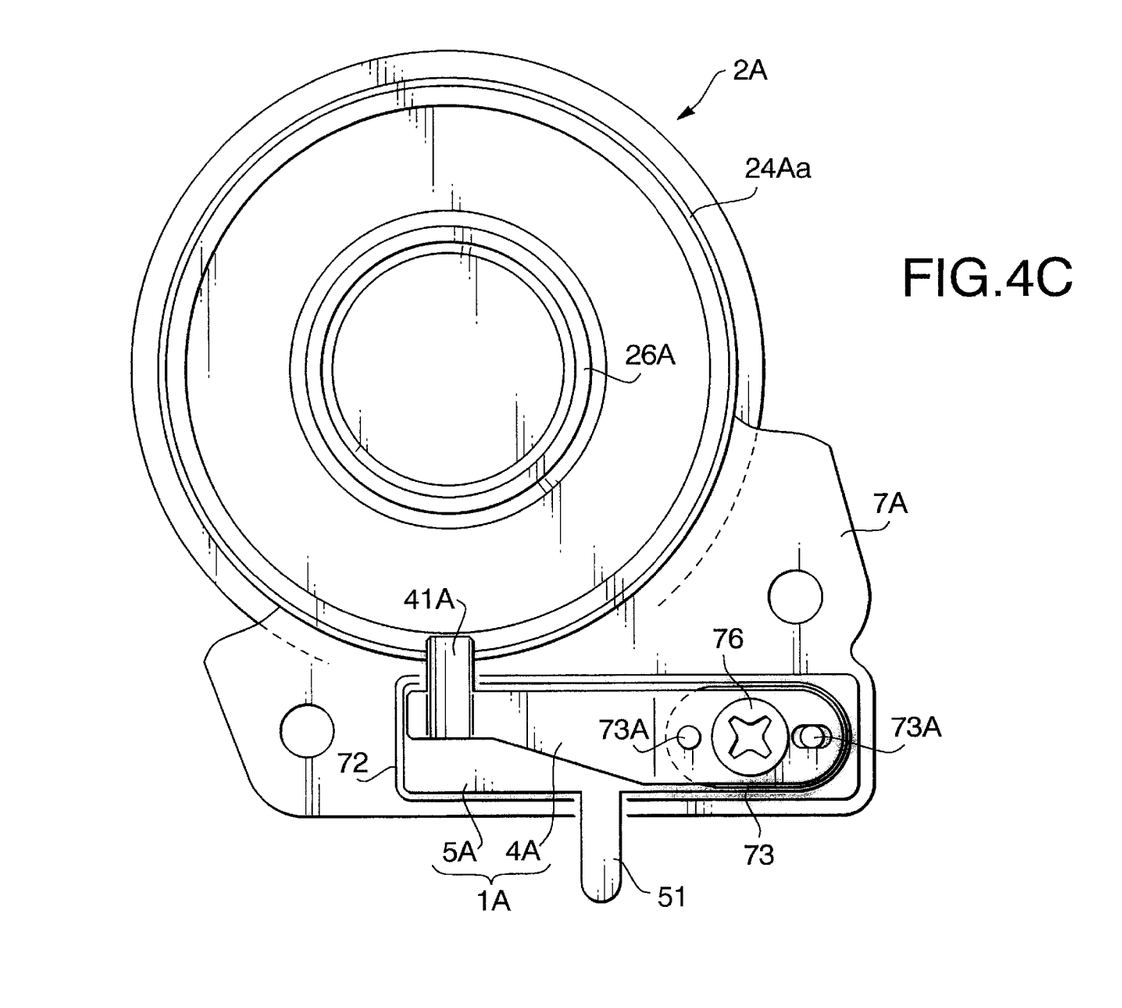
FIG. 4C is a schematic right side view of FIG. 4A.

The U-shaped hook portion 41A is formed to extend toward the center opening 75 of the fitting plate 7A to such an extent that, under the state illustrated in FIG. 4B in which the container cap 2A is completely fastened to the fitting plate 7A, the hook portion 41A is pressed and moved by the peripheral edge of the inner surface of the cap 2A toward inside the battery compartment 3A against the elasticity of the switching arm 4A, while, under the state illustrated in FIG. 5A in which the inner surface of the cap 2A does not press the hook portion 41A, it is forced to touch the switching plate 5B fixed to the fitting plate 7A by the elasticity of the arm 4A.

Hereafter, a battery exchange in the above constituted battery holding structure will be explained exemplifying the case in which an old battery accommodated in the battery container unit 100 is replaced with a new battery.

First of all, a coin or the like is fitted in the center groove 23 on the outer surface of the container cap 2A, and rotated in a clockwise-direction to unscrew the container cap 2A from the fitting plate 7A.

Figure 5B:
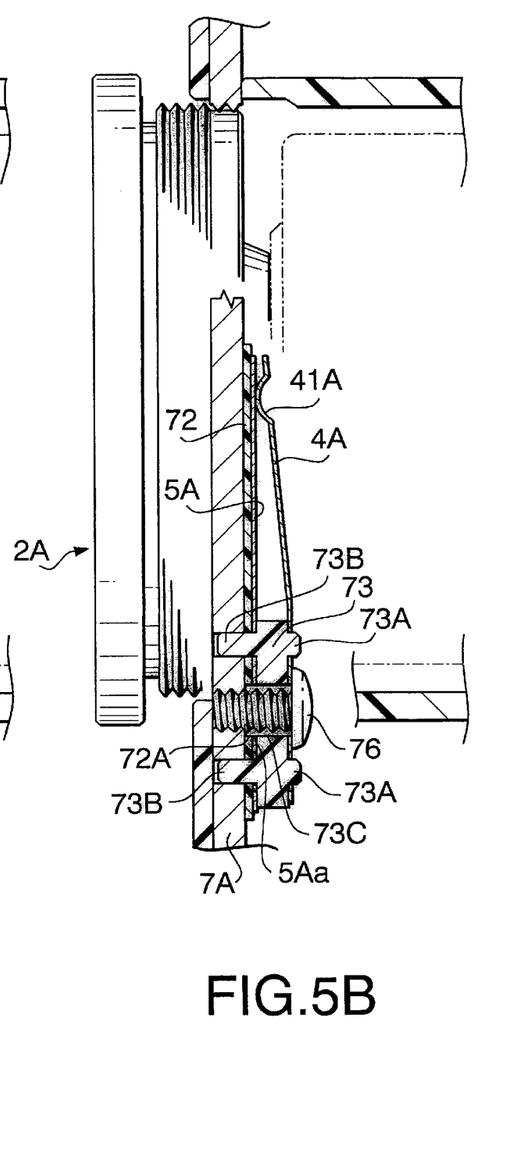

When the cap 2A is rotated by a certain amount, the cap 2 is moved to the position illustrated in FIG. 5B, where the U-shaped hook portion 41A is not pressed by the cap 2A and comes into contact with the switching plate 5A.

With further rotating the cap 2A, the external thread 24A*a* of the center boss 24A of the cap 2A is completely disengaged from the internal thread 71 of the fitting plate 7A. Thus, the cap 2A can be separated from the camera 10, and a currently loaded battery 9 is taken out of the container unit 100.

Then, a new battery 9 is inserted into the battery compartment 3A and then the container cap 2A is pushed toward the center opening 75 of the fitting plate 7A and rotated counter-clockwise direction by a coin or the like so that the external thread 24A*a* of the center boss 24A of the cap 2A is screwed with the internal thread 71 of the fitting plate 7A.

In the meantime, when the cap 2A is inserted into the compartment 3A by a certain amount, i.e., beyond the position illustrated in FIG. 5A, it becomes in contact with the U-shaped hook portion 41A, and presses it to be moved inwardly against the elasticity of the switching arm 4A.

When the external thread 24A*a* of the center boss 24A of the cap 2A is completely meshed with the internal thread 71 of the fitting plate 7A as illustrated in FIG. 4A, a new battery 9 is firmly located between the leaf-spring electric terminal 39 and the top surface 26*a* of the circular rib 26 of the cap 2A in the battery compartment 3A. Further, the U-shaped hook portion 41A of the switching arm 4A is kept away from the switching plate 5A by means of the inner peripheral surface of the container cap 2A.

According to the above explained battery holding structure in a camera embodying the invention, the switching mechanism 1A is being turned ON during the substantial period of the battery exchange in the camera 10, which causes a. CPU, not shown, of the camera 10 to be kept in a RESET state.

More particularly, under the normal condition illustrated in FIG. 4B wherein a battery 9 is completely loaded in the battery compartment 3A to function as a power source for electrically operating the camera 10, the inner peripheral surface of the container cap 2A prevents the U-shaped hook portion 41A of the switching arm 4A to contact the switching plate 5A, so that the switching mechanism 1A is turned OFF.

On the other hand, at the initial stage of the battery exchange, the container cap 2A is moved toward left in FIG. 4B and the U-shaped hook portion 41A is allowed to be in contact with the switching plate 5 by the elasticity of the switching arm 4A, as illustrated in FIG. 5B, so that the switching mechanism 1A is turned ON. This ON state of the switching mechanism 1A is kept until the inner peripheral surface of the container cap 2A is again inserted into the battery compartment 3 and brought into contact with the U-shaped hook portion 41A at the last stage of the battery exchange, to force it to be moved inwardly against the elasticity of the switching arm 4A.

Thus, even though a battery 9 may insecurely keep or intermittently restore the contact with the leaf-spring terminal 39 and the top surface 26A*a* of the rib 26, after the initial stage or before the last stage of battery exchange, the operations by a CPU, not shown, of the camera 10 is not influenced at all as a CPU is kept at its RESET state by the switching mechanism 1A during battery exchange.

As above described, in accordance with the battery holding structure in a camera embodying the invention, a CPU is kept at its RESET state during the substantial period of battery exchange, so that a CPU does not run away if chatterings or the like occur during battery exchange, and a camera can be properly operated after replacement of accommodated battery.

The present disclosure relates to subject matter contained in Japanese Patent Application No. HEI 10-280148, filed on Oct. 1, 1998, which is expressly incorporated herein by reference in its entirety.

What is claimed is:

1. A battery holding structure for exchangeably accommodating a battery therein which comprises:

a battery container for exchangeably accommodating a battery therein, said container being provided with an opening through which a battery is to be taken in and out;

a container cap detacheably coupled to said battery container to close said opening of the container, said container cap having a contact configured to removably engage a terminal of the battery; and a switching mechanism including a stationary contact member and a movable contact member both disposed on said battery container, said movable contact member being arranged to be actuated in response to the relative movement of said container cap with respect to said container.

2. The structure according to claim 1, wherein said container cap comprises a screw-type container cap to be threaded to said battery container.

3. The structure according to claim 2, wherein said battery container comprises a fitting member fixed in front of said opening, said fitting member being formed with a center hole corresponding to said opening and provided with an inner thread on the inner circumferential surface of said center hole; and wherein said container cap is provided with a center boss having an external thread on the outer circumferential surface thereof to be screwed to said inner thread of the fitting member.

4. The structure according to claim 3, which further comprises a sleeve member to be slidably accommodated in said battery container, said sleeve member being detacheably coupled to said container cap at one end thereof to accomodate a battery therein with the upper portion of the battery being protruded from the other end of said sleeve member; and wherein said battery container comprises an inner wall member in which a battery is accommodated together with said sleeve member.

5. The structure according to claim 4, wherein said inner wall member is formed with a through-hole at the position where said other end of the sleeve member reaches when the sleeve member is fully introduced into said container; and wherein said stationary contact member is fixed on the outer surface of the inner wall member, while said movable contact member is provided with a free end portion which is biased to go beyond said inner wall member via said through-hole.

6. The structure according to claim 5, wherein said free end of the movable contact member is pressed outwardly against the biasing force by the outer surface of said sleeve member when the sleeve member is fully introduced into said container.

7. The structure according to claim 6, wherein said movable contact member is made of an elastic material and is normally forced to contact said stationary member by its elasticity, and is detached from said stationary member when said free end is pressed outwardly by said sleeve member.

8. The structure according to claim 3, wherein said stationary contact member is fixed on the inner surface of said fitting member, while said movable contact member is provided with a free end portion which is arranged to contact said stationary contact member, said free end portion being formed to be pressed by said container cap when the container cap is screwed to said fitting member.

9. The structure according to claim 8, wherein said movable contact member is made of an elastic material and is normally forced to contact said stationary member by its elasticity, and is detached from said stationary member when said free end is pressed by said container cap.

10. A camera employing a battery as a power source for electronically operating a control system of said camera, which comprises:
a battery container for exchangeably accommodating a battery therein, said container being provided with an opening through which a battery is to be taken in and out;
a container cap detacheably coupled to said battery container to close said opening of the container, said container cap having a contact configured to removably engage a terminal of the battery, said contact further configured to conduct power to the control system from the battery; and
a switching mechanism including a stationary contact member and a movable contact member both disposed on said battery container, said movable contact member being arranged to be actuated in response to the relative movement of said container cap with respect to said container,
wherein the operation of said control system is suspended when said switching mechanism is operated.

11. The camera according to claim 10, wherein said switching mechanism is connected to a reset terminal of said control system to keep the control system at its reset state during exchange of battery.

12. The camera according to claim 10, wherein said container cap comprises a screw-type container cap to be threaded to said battery container.

13. The camera according to claim 12, wherein said battery container comprises a fitting member fixed in front of said opening, said fitting member being formed with a center hole corresponding to said opening and provided with an inner thread on the inner circumferential surface of said center hole; and wherein said container cap is provided with a center boss having an external thread on the outer circumferential surface thereof to be screwed to said inner thread of the fitting member.

14. The camera according to claim 13, which further comprises a sleeve member to be slidably accommodated in said battery container, said sleeve member being detacheably coupled to said container cap at one end thereof to accomodate a battery therein with the upper portion of the battery being protruded from the other end of said sleeve member; and wherein said battery container comprises an inner wall member in which a battery is accommodated together with said sleeve member.

15. The camera according to claim 14, wherein said inner wall member is formed with a through-hole at the position where said other end of the sleeve member reaches when the sleeve member is fully introduced into said container; and wherein said stationary contact member is fixed on the outer surface of the inner wall member, while said movable contact member is provided with a free end portion which is biased to go beyond said inner wall member via said through-hole.

16. The camera according to claim 15, wherein said free end of the movable contact member is pressed outwardly against the biasing force by the outer surface of said sleeve member when the sleeve member is fully introduced into said container.

17. The camera according to claim 16, wherein said movable contact member is made of an elastic material and is normally forced to contact said stationary member by its elasticity, and is detached from said stationary member when said free end is pressed outwardly by said sleeve member.

18. The camera according to claim 17, wherein said control system is kept at its reset state while said movable contact member is being connected to said stationary contact member.

19. The camera according to claim 12, wherein said stationary contact member is fixed on the inner surface of said fitting member, while said movable contact member is provided with a free end portion which is arranged to contact said stationary contact member, said free end portion being formed to be pressed by said container cap when the container cap is screwed to said fitting member.

20. The camera according to claim 19, wherein said movable contact member is made of an elastic material and is normally forced to contact said stationary member by its elasticity, and is detached from said stationary member when said free end portion is pressed by said container cap.

21. The camera according to claim 1, wherein said container cap is configured to actuate said movable contact member when said container cap is moved away from the battery in a direction coaxial to the battery.

22. The camera according to claim 1, wherein said container cap is configured to actuate said movable contact member when said container cap is rotated.

23. The camera according to claim 1, wherein said container cap is configured to actuate said movable contact member when said container cap is moved to a position where chattering would otherwise occur.

24. The camera according to claim 1, wherein said container cap is configured to actuate said movable contact member when said container cap is moved to a position where chattering does not occur.

25. The camera according to claim 1, wherein said container cap is configured to actuate said movable contact member when said container cap is moved, thereby preventing chattering.

26. The camera according to claim 10, wherein said container cap is configured to actuate said movable contact member when said container cap is moved away from the battery in a direction coaxial to the battery.

27. The camera according to claim 10, wherein said container cap is configured to actuate said movable contact member when said container cap is rotated.

28. The camera according to claim 10, wherein said container cap is configured to actuate said movable contact member when said container cap is moved to a position where chattering would otherwise occur.

29. The camera according to claim 10, wherein said container cap is configured to actuate said movable contact member when said container cap is moved to a position where chattering does not occur.

30. The camera according to claim 10, wherein said container cap is configured to actuate said movable contact member when said container cap is moved, thereby preventing chattering.

* * * * *